(12) United States Patent
Baudart et al.

(10) Patent No.: US 9,150,257 B2
(45) Date of Patent: Oct. 6, 2015

(54) TRANSVERSE ELEMENT COMPRISING A VEHICLE INSTRUMENT PANEL CROSSMEMBER AND A SUPPORT ELEMENT

(75) Inventors: Laurent Baudart, Fresnoy en Thelle (FR); Christian Brancheriau, Herblay (FR); Sergio Da Costa Pito, Cergy (FR); Albin Descamps, Montjavoult (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 14/127,915

(22) PCT Filed: Jun. 22, 2012

(86) PCT No.: PCT/EP2012/062071
§ 371 (c)(1),
(2), (4) Date: Dec. 19, 2013

(87) PCT Pub. No.: WO2012/175662
PCT Pub. Date: Dec. 27, 2012

(65) Prior Publication Data
US 2014/0138980 A1    May 22, 2014

(30) Foreign Application Priority Data
Jun. 23, 2011 (FR) ...................................... 11 55558

(51) Int. Cl.
| B62D 25/14 | (2006.01) |
|---|---|
| B62D 27/02 | (2006.01) |
| B60K 37/00 | (2006.01) |

(52) U.S. Cl.
CPC ............ B62D 25/145 (2013.01); B62D 27/023 (2013.01); *B60K 37/00* (2013.01); *B62D 25/142* (2013.01)

(58) Field of Classification Search
CPC .... B62D 25/14; B62D 25/145; B62D 25/147; B62D 27/02; B62D 27/023; B60K 37/00
USPC .............. 296/29, 70, 72, 193.01, 193.02, 205
See application file for complete search history.

(56) References Cited

U.S. PATENT DOCUMENTS

| 5,492,388 A  * | 2/1996 | Kawasaki ................ 296/193.02 |
| 2002/0167199 A1* | 11/2002 | Kim ........................ 296/203.02 |
| 2010/0001552 A1* | 1/2010 | Kim ........................ 296/193.02 |

FOREIGN PATENT DOCUMENTS

| FR | 2925008 A1 | 6/2009 |
| WO | WO 2007/104871 A1 | 9/2007 |
| WO | WO 2011/058270 A1 | 5/2011 |

OTHER PUBLICATIONS

English translation of WO 2007/104871, retreived Oct. 15, 2014 from PatentTranslate on the EPO website.*
International Search Report for application No. PCT/EP2012/062071, dated Aug. 8, 2012, 4 pages.

* cited by examiner

*Primary Examiner* — Jason S Daniels
(74) *Attorney, Agent, or Firm* — Reising Ethington P.C.

(57) ABSTRACT

The invention relates to a transverse element comprising:
  a crossmember (2) designed to support a motor vehicle instrument panel, chiefly comprising a tubular element; and
  at least one support element (28), having the shape of an L, designed to support one end of said tubular element and intended to be fixed to a front pillar (8) of said vehicle.

According to the invention, the transverse element comprises a first reinforcing element (48) designed to connect a first branch (30) of the support element to the crossmember (2) and a second reinforcing element (50) designed to connect the second branch (32) of the support element to the crossmember (2).

19 Claims, 4 Drawing Sheets

TRANSVERSE ELEMENT COMPRISING A VEHICLE INSTRUMENT PANEL CROSSMEMBER AND A SUPPORT ELEMENT

TECHNICAL FIELD

The present invention relates to a transverse element comprising:
- a crossmember, designed to support a motor vehicle instrument panel, primarily comprising a tubular element; and
- at least one support element, in the shape of an L, designed to support one end of said tubular element and intended to be fastened to a front pillar of said vehicle.

BACKGROUND

Such a transverse element is intended to extend between the left front pillar and right front pillar of a motor vehicle. Traditionally, the support element makes it possible to connect each end of the instrument panel crossmember to the front pillars. Currently, designers seek to reinforce the rigidity of the fastening between the crossmember on the body shell of the vehicle, in particular so that that transverse crossmember has good impact resistance.

Thus, in the example embodiment described in document FR 2,925,008, a hollow reinforcing tube is positioned so as to surround an end portion of the tube forming the crossmember.

In this example, the L-shaped support element comprises a first branch fastened to the associated front pillar. The second branch of the support element comprises an opening inside which part of the end of the reinforcing tube is inserted.

A lining part of the support element, positioned on the support element, has a solid surface closing the opening of the support element. This lining part comprises fastening means of the tube forming the crossmember and the reinforcing tube, so as to rigidly fasten the reinforcing tube to the tube forming the crossmember.

Such an example embodiment has the drawbacks of being complex and requiring the use of multiple reinforcements, making with the mass of the vehicle heavier.

SUMMARY

One aim of the invention is to offset the aforementioned drawbacks by proposing a lighter transverse member while preserving increased rigidity of the fastening of the crossmember on the body structure of the vehicle. Likewise, the transverse element according to the invention will have good impact resistance, in particular to side impacts.

To that end, the invention relates to a transverse element of the aforementioned type, comprising a first reinforcing element designed to connect a first branch of the support element to the crossmember and a second reinforcing element designed to connect the second branch of the support element to the crossmember.

The transverse element according to the invention may include one or more of the following features:
- the end of the crossmember may extend away from the support element;
- the transverse element may further comprise two connecting elements intended to be fastened to the support element and the end of the crossmember, the connecting elements forming a closed body receiving the first and second reinforcing elements;
- the first and second reinforcing elements may each be fastened to the connecting elements;
- the first and second reinforcing elements may each be fastened to the end of the crossmember;
- the first and second reinforcing elements may each be fastened to the support element;
- the first and second reinforcing elements may each include a folding area, the folding areas being oriented toward one another and fastened to one another;
- the support element, the two connecting elements and/or the first and second reinforcing elements may be obtained from a cut, stamped and/or folded sheet metal sheet, each element being able to be obtained from sheet metal with different materials or thicknesses.

The invention also relates to a motor vehicle body structure comprising a right front pillar and a left front pillar connecting the base to the roof of the vehicle, characterized in that said body structure comprises a transverse element according to the invention extending between the right and left front pillars.

According to one particular embodiment, the support element may be fastened on a support assuming the form of a box open on one face, the open face being fastened on one of the front pillars of the vehicle.

BRIEF DESCRIPTION OF THE DRAWINGS

The invention will be better understood upon reading the following description, provided solely as an example and done in reference to the appended drawings, in which.

DESCRIPTION OF THE ILLUSTRATED EMBODIMENT(S)

In the rest of the description, the terms "front", "rear", "right", "left", "upper", "lower", "longitudinal", "transverse", and "vertical" are to be understood in reference to the usual system of orthogonal axes of the motor vehicles shown in the Figures and having:
- a longitudinal axis X oriented from back to front,
- a transverse axis Y oriented from right to left, and
- a vertical axis Z oriented from bottom to top.

Figure 1:
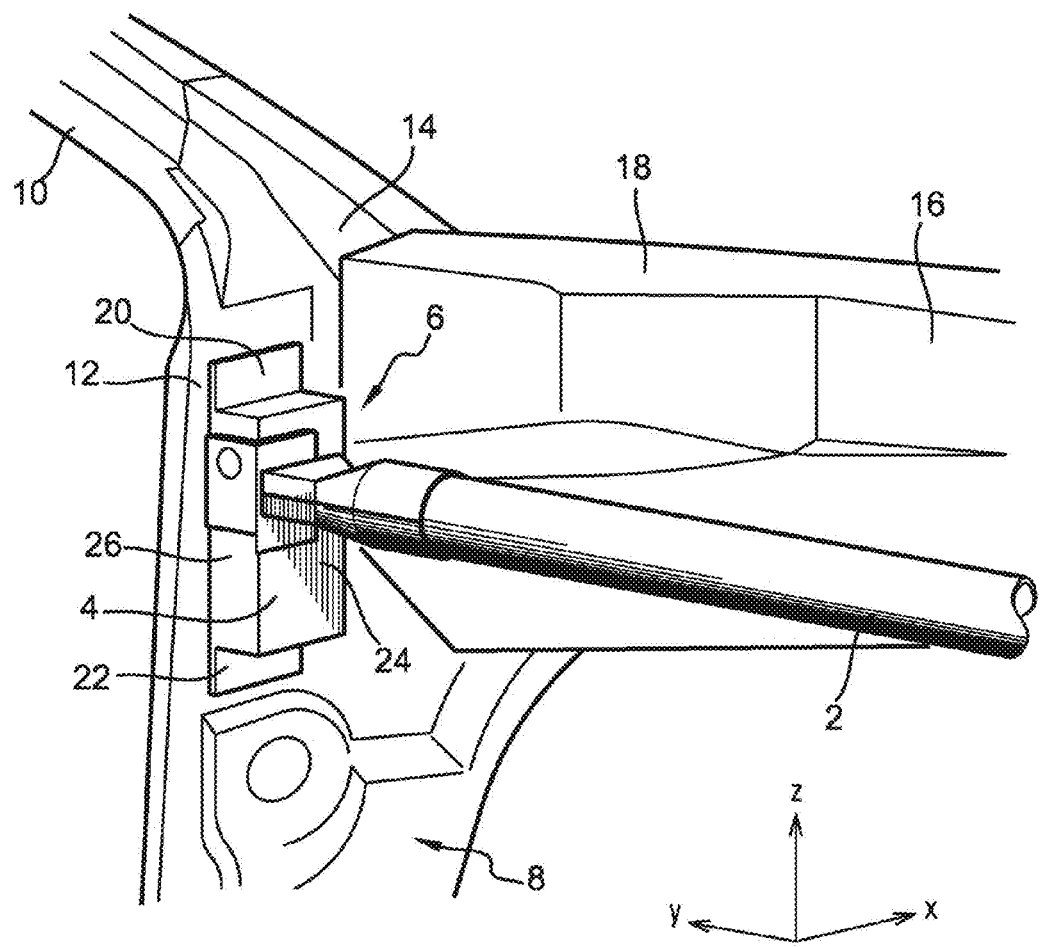
FIG. 1 is a perspective view of part of the body structure of a motor vehicle comprising an instrument panel crossmember whereof one of the ends is fastened on a support connected to the left front pillar of the body structure, said end being fastened on the support by means of a fastening assembly.

FIG. 1 shows, from the inside of the vehicle, the part of the body structure of the vehicle that corresponds to the left front pillar of said body structure, that pillar traditionally, like the symmetrical right front pillar, connecting the base, in particular made up of the floor, and the roof of the body structure.

As shown in FIG. 1, the body structure comprises an instrument panel crossmember 2 extending transversely in the vehicle, and the ends of which are respectively fastened on the right and left front pillars of the body structure, by a support 4. Traditionally, the crossmember is formed by a hollow tubular element.

This support 4, as well as a fastening assembly 6 fastening the end of the crossmember on the support 4, will be described in more detail later.

The crossmember 2 is designed to support the instrument panel (not shown) of the vehicle. It may also serve as a bearing for a steering column support of the vehicle, also not shown.

As illustrated in FIG. 1, the left front pillar 8 in particular comprises, between a recessed post 10 and the base of the body structure, part of one side of a passenger compartment 12, a lining 14, here a front fender back lining, and a reinforcement placed between the passenger compartment side 12 and the lining 14 (not shown).

In FIG. 1, an upper fire wall 16 is also shown separating the engine compartment of the vehicle and the passenger compartment of said vehicle, and a lower recess crossmember 18 situated below the windshield of said vehicle, these two parts 16 and 18 being situated substantially at the instrument panel crossmember 2.

As shown, the support 4 assumes the form of a box open on one face and comprising several rims, including the rims 20, 22, overhanging that face. These rims 20, 22 are configured to bear and be fastened on adjacent portions of parts of the left front pillar 8 of the vehicle. The box shape of the part 4 imparts a rigidity to that part that reinforces that of its connection to the front pillar.

The support 4 in particular comprises a side face 24 across from the end of the crossmember 2 and opposite the open face belonging to said support, and a rear face 26 extending substantially parallel to the upper firewall 16 and positioned across from the passenger compartment of the vehicle.

Figure 2:
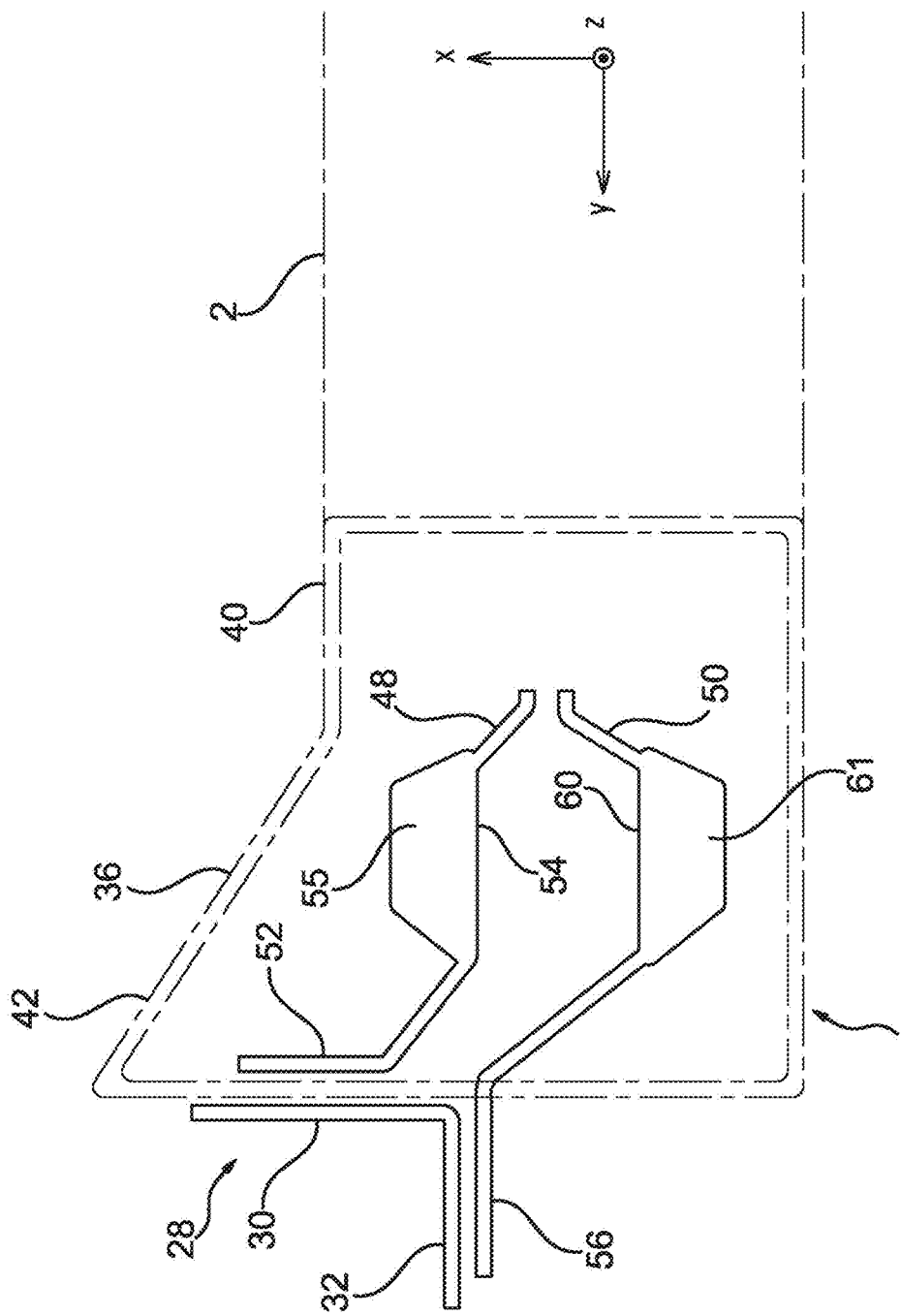
FIG. 2 is a diagrammatic cross-sectional top view of the end of the crossmember and a first fastening assembly.
Figure 3:
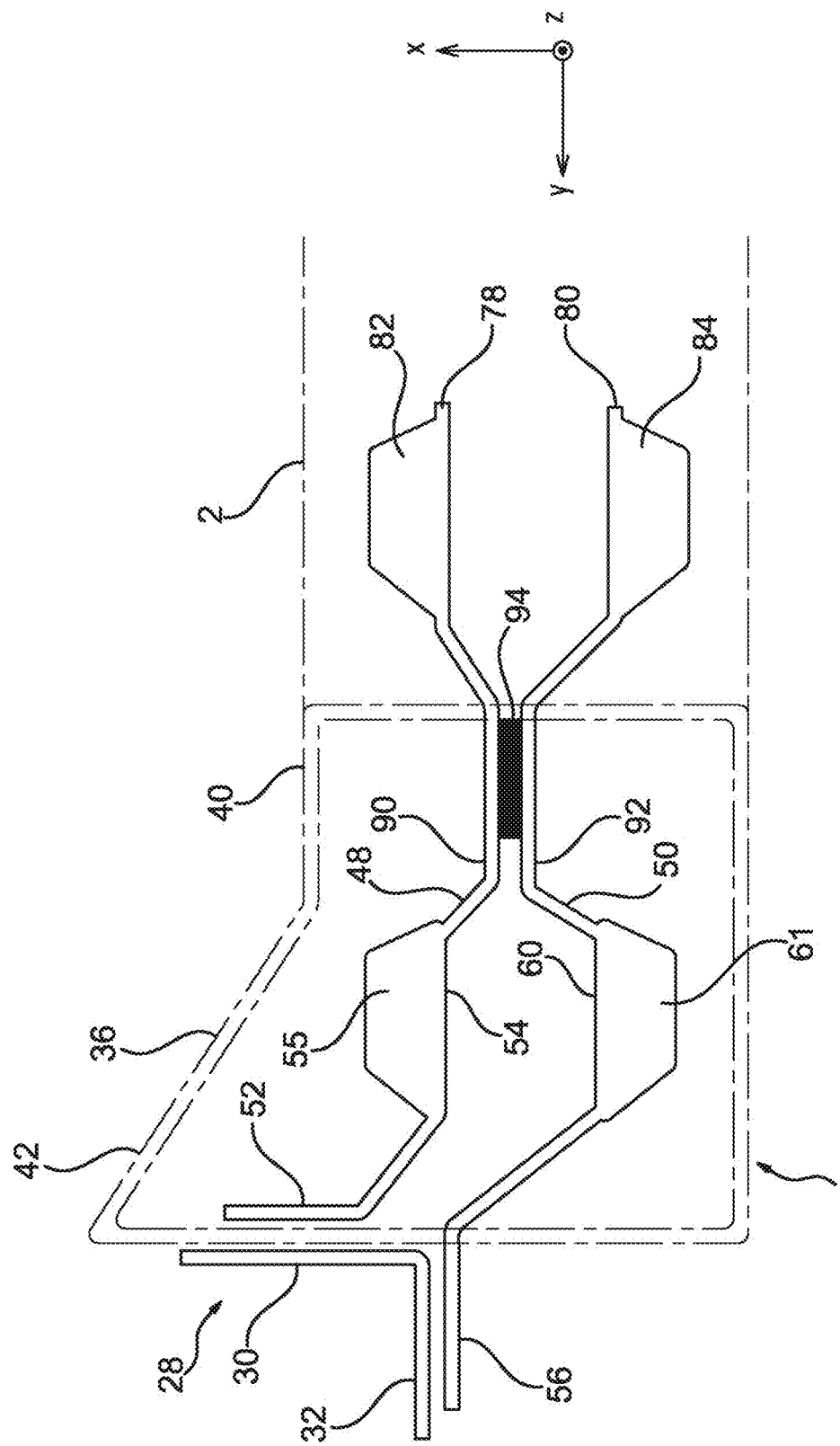
FIG. 3 is a cross-sectional diagrammatic top view of the end of the crossmember and of a second fastening assembly.
Figure 4:
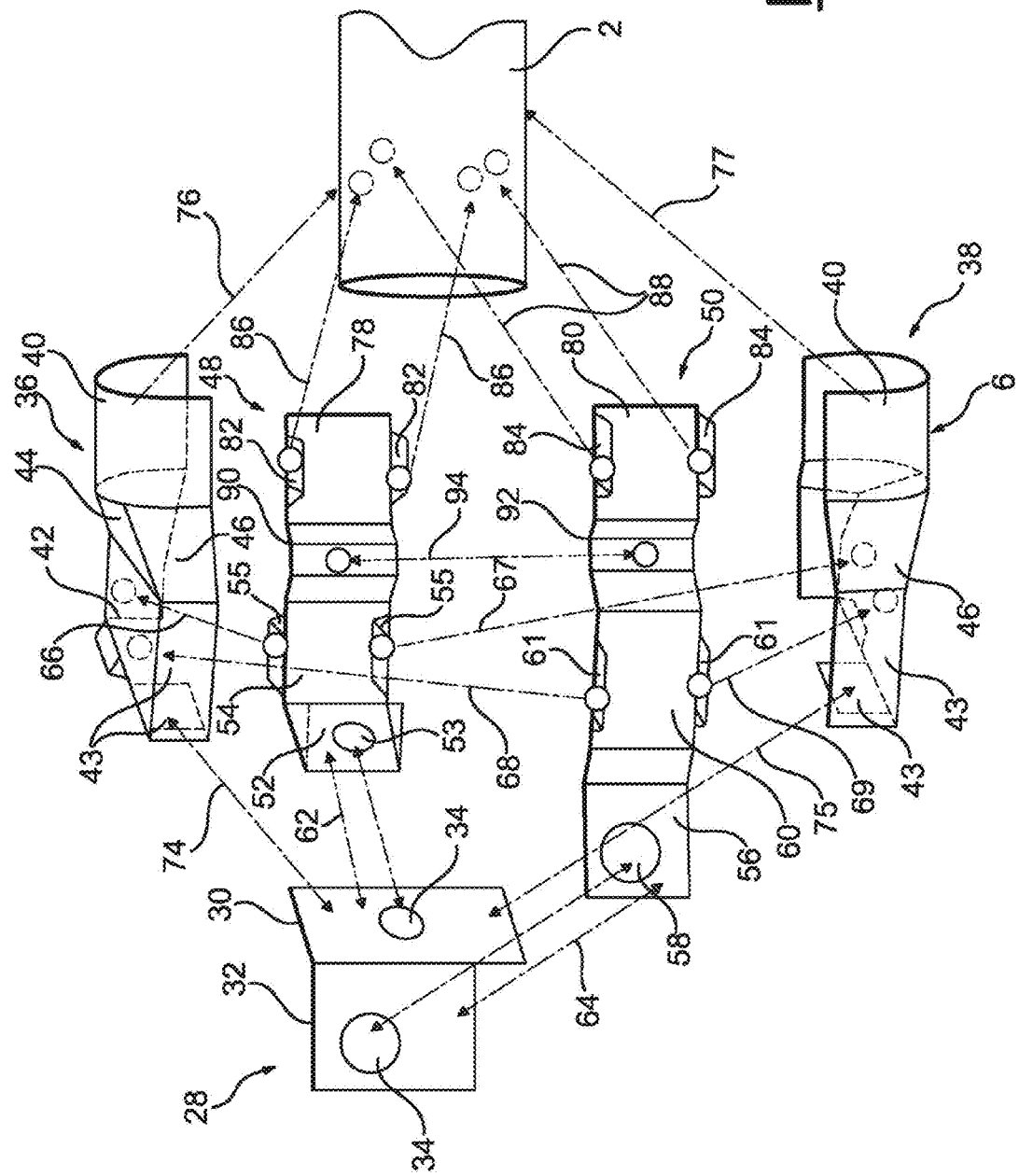
FIG. 4 is a diagrammatic exploded view of the fastening assembly of FIG. 3, said view showing the connections between the different elements making up the fastening assembly and the end of the crossmember.

In reference to FIGS. 2 to 4, we will now provide a more detailed description of the fastening of the left end of the crossmember 2 on its support 4, with the understanding that the fastening of the right end of said crossmember is substantially identical, symmetrically relative to the parts making up the support 4 and the fastening assembly 6 relative to the median plane of symmetry of the body structure of the vehicle. This description is more particularly based on FIG. 4, which shows a second fastening assembly, the first fastening assembly being fully comprised in that assembly, as will be described later.

The fastening assembly 6 is configured to ensure fastening of the end of the instrument panel crossmember 2 on the support 4, said end being situated at a distance from said support.

The fastening assembly 6 comprises an L-shaped support element 28, whereof a first branch 30 is configured to bear on and be fastened to the side face 24 of the support 4, and whereof the second branch 32 is configured to bear on and be fastened to the rear face 26 of the support 4.

The support element 28 is for example an L-shaped metal platen.

The first branch 30 extends in a plane substantially perpendicular to the axis of the crossmember 2, and the second branch 32 extends in a plane substantially parallel to the axis of the crossmember 2.

In order to ensure fastening of the support element 28 on the support 4, the first and second branches 30 and 32 are provided with the orifices 34 intended to allow the passage of suitable fastening means, such as screws (not shown).

The end of the instrument panel crossmember 2 preferably extends at a distance comprised between 0 mm and 200 mm from the first branch 30 of the support element 28.

Furthermore, the fastening assembly 6 comprises a first element 36 and a second element 38, upper and lower, respectively, called connecting elements intended to provide the connection between the end of the crossmember 2 and the support element 28. Only the upper element 36 will be described here, the upper element 36 and the lower element 38 being identical.

The upper element 36 comprises a first rounded portion 40 designed to mate with the shape of the end of the crossmember 2 so as to allow the fastening of said upper element 36 on the latter, and a second substantially rectangular portion 42 provided with rims 43, the first portion 40 and the second portion 42 being connected to each other by a third connecting portion 44 also provided with rims 46.

In the assembled position, the connecting elements 36 and 38 are positioned face-to-face, such that their first portion 40 each mates with the shape of the end of the crossmember 2 and is fastened on the latter. The first portion 40 of the upper element 36 is fastened on the end of the crossmember 2 using at least one fastening point 76. Likewise, the first portion 40 of the lower element 38 is fastened on the end of the crossmember 2 using at least one fastening point 77. The fastening points 76, 77, as well as all of the other points described later, are symbolized in FIG. 4 by arrows showing the parts fastened to one another.

The rims 43 belonging to the second portions 42 overlap each other so as to ensure fastening of the connecting elements 36 and 38 on one another. Likewise, the rims 46 belonging to the third connecting portions 44 overlap each other so as to ensure their fastening on one another.

Thus, in the assembled position, the connecting elements 36 and 38 form a closed body. The lateral ends of these connecting elements 36 and 38 supported by the second parts 42 are fastened on the first branch 30 of the support element 28 by their rims 43. The upper element 36 and the lower element 38 are fastened on the support element 28 using fastening points 74 and 75, respectively.

Furthermore, the fastening assembly 6 comprises a first element 48 and a second element 50, called reinforcing elements, designed to be positioned inside the closed body formed by the connecting elements 36 and 38.

In the examples shown in FIGS. 2 to 4, the reinforcing elements 48 and 50 are made up of a folded sheet extending in the assembled position in a substantially vertical direction Z.

A first portion 52 of the first element 48 is designed to bear on the first branch 30 of the support element 28 and to be fastened on said first branch 30. In order to ensure fastening of the first element 48 on the support element 28, the first portion 52 includes an orifice 53 designed to receive the fastening means ensuring fastening of the support element 28 on the support 4, and at least one fastening point 62 is formed between the first portion 52 and the first branch 30.

The first element 48 includes a second portion 54. Each upper and lower end of said second portion 54 includes a rim 55 making it possible to fasten said portion 54 on the inner faces of the second portions 42 belonging to the connecting elements 36 and 38. The second portion 54 is fastened on the second portion 42 of the upper element 36 using at least one fastening point 66 and on the second portion 42 of the lower element 38 using at least one fastening point 67.

The second reinforcing element 50 is made up of sheet metal including a first portion 56 designed to bear on the second branch 32 of the support element 28 and to be fastened on said second branch 32. In order to ensure fastening of the second element 50 on the support element 28, the first portion 56 includes an orifice 58 designed to receive the fastening means ensuring fastening of the support element 28 on the support 4, and a fastening point 64 is formed between the first portion 56 and the second branch 32.

The second element 50 includes a second portion 60. Each upper and lower end of said second portion 60 is provided with a rim 61 making it possible to fasten said second portion 60 on the inner faces of the second portions 42 belonging to the connecting elements 36 and 38. The second portion 60 is fastened on the second portion 42 of the upper element 36 using at least one fastening point 68 and on the second portion 42 of the lower element 38 using at least one fastening point 69.

Thus, in the assembled position, the second portions 54, 60 of the reinforcing elements 48 and 50 extend substantially parallel.

We will now more particularly describe the second embodiment of the fastening assembly 6. The aforementioned elements being shared by the first and second embodiments of the fastening assembly 6, they will not be described again.

According to this embodiment, the reinforcing elements 48 and 50 each include an additional portion, extending beyond the fastening points 66, 68 with the connecting elements 36 and 38.

To that end, the reinforcing elements 48 and 50 each have a third portion 78 and 80, respectively, designed to be positioned inside the hollow tubular body forming the instrument panel crossmember.

The upper and lower ends of these third portions 78 and 80 are each provided with a rim 82, 84, respectively, making it possible to fasten said ends to the inside of the hollow body forming the instrument panel crossmember. The upper and lower ends of the third portion 78 are each fastened using at least one fastening point 86. Likewise, the upper and lower ends of the third portion 80 are each fastened using at least one fastening point 88.

According to this embodiment, the reinforcing elements 48 and 50 each further include a folding area 90, 92, respectively, positioned between the second portion 54 and the third portion 78 of the first element 48 and between the second portion 60 and the third portion 80 of the second element 50, respectively. In the assembled position, these folding areas are each oriented toward one another such that said areas are fastened to one another using at least one fastening point 94.

Preferably, the support element 28, the connecting elements 36 and 38, and the reinforcing elements 48 and 50 used in the first or second embodiment are each obtained from a cut, stamped and/or folded sheet metal sheet.

Each of these elements forming the fastening assembly 6 may be obtained from sheet metal with a different material or thickness, so as to optimize the mass of said assembly.

Traditionally, the fastening of the different rims belonging to the connecting elements 36, 38 and the reinforcing elements 48, 50 may be done using weld spots that may be made by electric weld clamps, the weld spots then forming the fastening points described above.

The fastening of the end of the instrument panel crossmember as described above has the advantage of having a reinforced connection between the end of the crossmember 2 and the support 4 reinforcing the rigidity of the fastening of the crossmember on the body structure of the vehicle, so as to optimize the transmission of forces between said crossmember and the front pillars of the vehicle.

The fastening of the end of the instrument panel crossmember is done along the transverse axis Y and along the longitudinal axis X of the vehicle, which ensures good resistance of the crossmember in all directions relative to the body structure, in particular in case of impact.

The invention claimed is:

1. A transverse element comprising:
   a crossmember, designed to support a motor vehicle instrument panel, said crossmember comprising a tubular element;
   at least one support element, in the shape of an L, designed to support one end of said crossmember and intended to be fastened to a front pillar of said vehicle, wherein the end of the crossmember extends away from the support element;
   a first reinforcing element designed to connect a first branch of the support element to the crossmember;
   a second reinforcing element designed to connect a second branch of the support element to the crossmember, wherein the first reinforcing element and the second reinforcing element are formed by two distinct parts; and
   two connecting elements intended to be fastened to the support element and the end of the crossmember, the connecting elements forming a closed body receiving the first and second reinforcing elements.

2. The transverse element according to claim 1, wherein the first and second reinforcing elements are each fastened to the connecting elements.

3. The transverse element according to claim 1, wherein the first and second reinforcing elements are each fastened to the end of the crossmember.

4. The transverse element according to claim 1, wherein the first and second reinforcing elements are each fastened to the support element.

5. The transverse element according to claim 1, wherein the first and second reinforcing elements each include a folding area, the folding areas being oriented toward one another and fastened to one another.

6. The transverse element according to claim 1, wherein the support element, the two connecting elements and/or the first and second reinforcing elements are obtained from a cut, stamped and/or folded sheet metal sheet, each element being able to be obtained from sheet metal with different materials or thicknesses.

7. A motor vehicle body structure comprising a right front pillar and a left front pillar connecting a base to a roof of the vehicle, wherein said body structure comprises the transverse element according to claim 1 extending between the right and left front pillars.

8. The body structure according to claim 7, wherein the support element is fastened on a support assuming the form of a box open on one face, the open face being fastened on one of the front pillars of the vehicle.

9. A transverse element comprising:
   a crossmember, designed to support a motor vehicle instrument panel, said crossmember comprising a tubular element;
   at least one support element, in the shape of an L, designed to support one end of said crossmember and intended to be fastened to a front pillar of said vehicle;
   a first reinforcing element designed to connect a first branch of the support element to the crossmember; and
   a second reinforcing element designed to connect a second branch of the support element to the crossmember, wherein each of the first reinforcing element and the second reinforcing element extend inside the transverse element.

10. The transverse element according to claim 9, wherein the end of the crossmember extends away from the at least one support element.

11. The transverse element according to claim 10, further comprising two connecting elements intended to be fastened to the at least one support element and the end of the crossmember, the connecting elements forming a closed body receiving the first and second reinforcing elements.

12. The transverse element according to claim 11, wherein the first and second reinforcing elements are each fastened to the connecting elements.

13. The transverse element according to claim 11, wherein the support element, the two connecting elements and/or the first and second reinforcing elements are obtained from a cut, stamped and/or folded sheet metal sheet, each element being able to be obtained from sheet metal with different materials or thicknesses.

14. The transverse element according to claim 9, wherein the first and second reinforcing elements are each fastened to the end of the crossmember.

15. The transverse element according to claim 9, wherein the first and second reinforcing elements are each fastened to the support element.

16. The transverse element according to claim 9, wherein the first and second reinforcing elements each include a folding area, the folding areas being oriented toward one another and fastened to one another.

17. A motor vehicle body structure comprising a right front pillar and a left front pillar connecting a base to a roof of the vehicle, wherein said body structure comprises the transverse element according to claim 9 extending between the right and left front pillars.

18. The body structure according to claim 17, wherein the support element is fastened on a support assuming the form of a box open on one face, the open face being fastened on one of the front pillars of the vehicle.

19. A transverse element comprising:
- a crossmember, designed to support a motor vehicle instrument panel, said crossmember comprising a tubular element;
- at least one support element, in the shape of an L, designed to support one end of said tubular element and intended to be fastened to a front pillar of said vehicle;
- a first reinforcing element designed to connect a first branch of the support element to the crossmember; and
- a second reinforcing element designed to connect a second branch of the support element to the crossmember, wherein the first reinforcing element and the second reinforcing element are formed by two distinct parts, wherein the first and second reinforcing elements each include a folding area, the folding areas being oriented toward one another and fastened to one another.

* * * * *